US008762704B2

(12) United States Patent
Rothkopf et al.

(10) Patent No.: US 8,762,704 B2
(45) Date of Patent: Jun. 24, 2014

(54) CUSTOMIZED CONTENT FOR ELECTRONIC DEVICES

(75) Inventors: Fletcher Rothkopf, Los Altos, CA (US); Teodor Dabov, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/248,950

(22) Filed: Sep. 29, 2011

(65) Prior Publication Data

US 2013/0086373 A1    Apr. 4, 2013

(51) Int. Cl.
  *G06F 9/00* (2006.01)
  *G06F 9/445* (2006.01)
  *H01H 36/00* (2006.01)

(52) U.S. Cl.
  CPC .............. *G06F 9/445* (2013.01); *H01H 36/00* (2013.01)
  USPC ................. 713/100; 713/1; 713/2; 53/266.1; 206/320; 335/205; 335/207; 710/104; 717/168; 717/174

(58) Field of Classification Search
  None
  See application file for complete search history.

(56) References Cited

U.S. PATENT DOCUMENTS

| | | | | |
|---|---|---|---|---|
| 4,734,832 | A * | 3/1988 | Moriano et al. | 362/158 |
| 5,226,540 | A * | 7/1993 | Bradbury | 206/576 |
| 5,469,692 | A * | 11/1995 | Xanthopoulos | 53/474 |
| 5,927,050 | A * | 7/1999 | Houck et al. | 53/428 |
| 6,012,961 | A | 1/2000 | Sharpe, III et al. | 446/298 |
| 6,142,298 | A * | 11/2000 | Wu | 206/305 |
| 7,003,128 | B2 * | 2/2006 | Boonen | 381/322 |
| 7,391,321 | B2 * | 6/2008 | Twitchell, Jr. | 340/539.13 |
| 7,743,999 | B1 | 6/2010 | Griffin | 235/486 |
| 7,985,911 | B2 | 7/2011 | Oppenheimer | 84/600 |
| 7,999,673 | B2 * | 8/2011 | Killian et al. | 340/572.1 |
| 2003/0014496 | A1 | 1/2003 | Spencer et al. | 709/217 |
| 2004/0196997 | A1 * | 10/2004 | Boonen | 381/322 |
| 2007/0150887 | A1 | 6/2007 | Shapiro | 717/174 |
| 2007/0215663 | A1 * | 9/2007 | Chongson et al. | 224/930 |
| 2008/0048838 | A1 * | 2/2008 | Montgomery et al. | 340/10.51 |
| 2008/0129504 | A1 * | 6/2008 | Killian et al. | 340/572.1 |
| 2009/0291677 | A1 * | 11/2009 | Lauby et al. | 455/418 |
| 2010/0123534 | A1 * | 5/2010 | Gubbins et al. | 335/229 |
| 2010/0127855 | A1 * | 5/2010 | Zucker et al. | 340/540 |
| 2010/0218465 | A1 * | 9/2010 | Takaya | 53/467 |
| 2011/0004325 | A1 | 1/2011 | Ayal | 700/17 |
| 2011/0316655 | A1 * | 12/2011 | Mehraban et al. | 335/207 |
| 2012/0118773 | A1 * | 5/2012 | Rayner | 206/320 |
| 2012/0211382 | A1 * | 8/2012 | Rayner | 206/320 |
| 2012/0314354 | A1 * | 12/2012 | Rayner | 361/679.01 |

FOREIGN PATENT DOCUMENTS

| EP | 1266834 | 12/2002 | B65D 5/54 |
|---|---|---|---|
| EP | 1266834 A1 * | 12/2002 | |

OTHER PUBLICATIONS

Wikipedia Article on 'Reed Switch' from Mar. 9, 2010.*
'Sensing Techniques for Mobile Interaction' by Ken Hinckley et al., copyright ACM, 2000.*
Author Unknown, "Acclaro Transparent iPod case," www.radtech. us/products/Acclaro.aspx, 1 page, at least as early as Sep. 8, 2011.
Application No. PCT/US2012/058129, International Search Report and Written Opinion, dated Jan. 4, 2013, 42 pages.

* cited by examiner

*Primary Examiner* — Steven Snyder
(74) *Attorney, Agent, or Firm* — Novak Druce Connolly Bove + Quigg LLP (57) ABSTRACT

A method for providing customized content to an electronic device. The method may include activating the electronic device through a packaging that substantially surrounds the electronic device, without substantially damaging or removing the packaging. Once the device is activating, connecting the electronic device to a content and providing the content to the electronic device without substantially damaging or removing the packaging.

18 Claims, 11 Drawing Sheets

CUSTOMIZED CONTENT FOR ELECTRONIC DEVICES

TECHNICAL FIELD

The present invention relates generally to electronic devices and more specifically, to providing content to electronic devices.

BACKGROUND

Electronic devices such as digital music players, video players, smart phones, mobile gaming devices, laptops, and so on may include a variety of content such as music files, video files, applications, and so on. These electronic devices may often be sold in stores, online, or other retailers in packaging. The packaging may protect the electronic devices from damage during shipping, storage, and so on, as well as enhance attractiveness to consumers and/or reduce the likelihood of shoplifting. Prior to a particular electronic device being removed from its packaging, the content on the device typically is not customized. In other words, every electronic device of a particular model, if it includes any content, usually includes the same content. This is because it may be extremely time consuming and prohibitively expensive to customize content for each specific electronic device prior to packaging, as each device need to be accessed individually, slowing manufacturing, shipping, and other processes.

SUMMARY

Examples of embodiments described herein may take the form of a method for providing customized content to an electronic device. The method may include activating the electronic device through a package that substantially surrounds the electronic device, without substantially damaging or removing the package. Once the device is activated, connecting the electronic device to content and providing the content to the electronic device without substantially damaging or removing the package.

Other embodiments may take the form of a method for individualizing content on an electronic device enclosed with a package. The method may include connecting a data connector in the electronic device through the package. Once the data connector has been connected to the electronic device, transferring content from a computer to the electronic device and disconnecting the electronic device from the data connector.

Still other embodiments may include a system for packaging an electronic device. The system includes an electronic device and a package. The electronic device includes a processor and an enclosure at least partially surrounding the processor and defining an input port. The package substantially surrounds the electronic device and at least partially protects debris from encountering the electronic device. The package includes an access aperture substantially aligned with the input port, where the access aperture is configured to receive a connector for communicating with the electronic device.

SPECIFICATION

Some embodiments described herein may take the form of various methods and devices for providing customized content to electronic devices without removing the electronic devices from the packaging. As described herein "content" refers to any type of software, firmware, or electronic files, such as but not limited to, data files, operating systems, software or firmware updates, music files, images, videos, and so on. In one embodiment, a package for electronic devices includes a connection or access aperture that may substantially aligned with an input port or other port for the device. In this embodiment, the access aperture is configured to receive a connector therethrough, and the connector may electronically connect to the device through the packaging. Once the device is connected to the connector, a user may selectively choose content to be downloaded or associated with the device.

In another embodiment, the package may include an embedded or temporary connector that may include a connection port accessible through the packaging. In this embodiment, the temporary connector may be made of a relatively disposable or inexpensive material, one example of which is cardboard with copper wiring attached thereto, or another similar type of temporary connector mechanism. The temporary connector may be positioned in the packaging so as to be in communication with the device. An external connector may then connect to the device through the temporary connector. Once the connector is attached, a user may select content to be downloaded or associated with the device.

In yet another embodiment, the device may be activated wirelessly and data may be transmitted wirelessly through the package. For example, the device may be turned on physically by using a controller, such as a magnetic controller, that may displace the power switch from a first position to a second position. In another example, the controller may include a radio frequency identification (RFID) tag that may be used to activate the device. In another example, the device may include a sensor and may activate itself when a particular motion, sound, light, or image is sensed. The device may also be activated by inducing a current in the device through a magnetic coil or the like. Once the device is activated, the user may select content to be downloaded or associated with the device.

The user may select content from another computing device, such as a computer or kiosk, or may select content from a wireless source (e.g., cloud storage, local or online retailer, and the like). The content may be downloaded directly to the device through the package, or may be associated with the device, e.g., through a serial number of the device, gift card identification, user name, or other identification code. Additionally or alternatively, the user may select to delete content from the device, rather than add content to the device. In other examples, the content may be created by the user using the device, e.g., by taking a picture using a camera on the device when the device has been activated.

The device may be further customized, in that the content may be integrated into a software package which may allow customized home screens, startup screens, or background images. In one example, a user may associate content with the device that may be select images that may apparent on a home screen or background screen of the electronic device.

Furthermore, select content may be printed and included as a part of the package. For example, the user may create content or may select content to be printed by a printing device and placed on the package. The printed content may be selected to correspond to the electrical content stored or tied to the device.

The Electronic Device

Figure 1A:
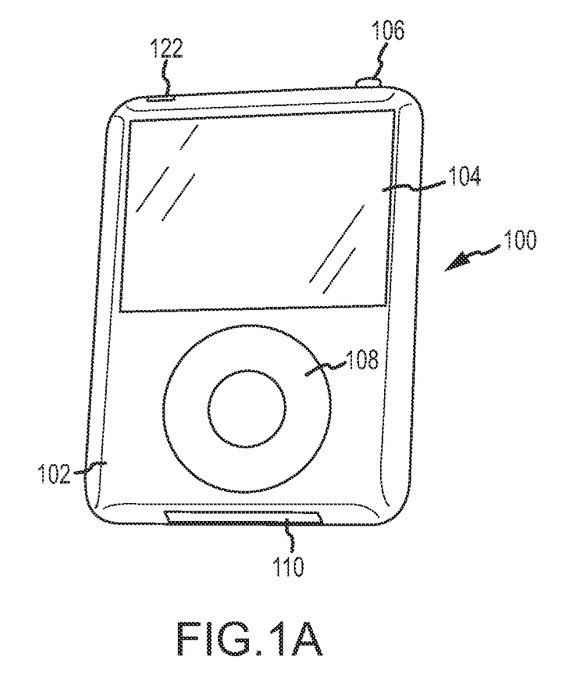
FIG. 1A is a perspective view of an exemplary electronic device.
Figure 1B:
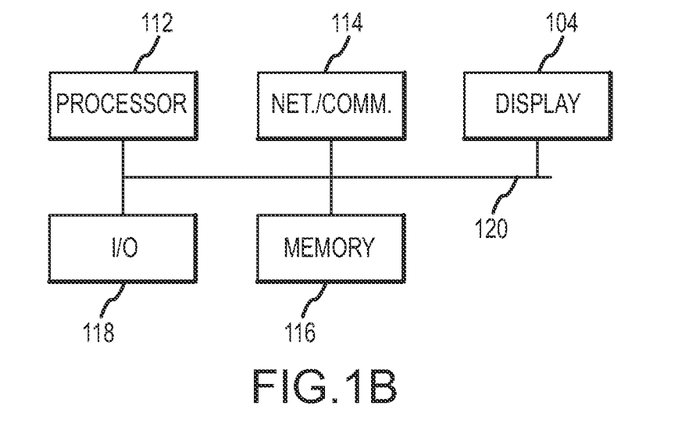
FIG. 1B is a block diagram of the electronic device of FIG. 1A.

The methods and devices described herein can be used with substantially any type of device that may be transported, sold, or otherwise enclosed in some form of packaging. However, in some embodiments, these methods and devices may be used with an electronic device 100. FIG. 1A is an isometric view of an exemplary electronic device. FIG. 1B is an exemplary block diagram of the electronic device 100. The electronic device 100 may be substantially any type of electronic device that stores content, such as but not limited to, a computer, mobile phone, smart phone, digital music player, digital camera, calculator, personal digital assistant, television, and so on. In the embodiment illustrated in FIG. 1A, the electronic device 100 is a portable electronic device such as a digital musical player or mobile phone, but other options are envisioned and the figures are meant to be exemplary only.

The electronic device 100 may include a display 104, at least one input member 108, an input port 110, a power switch 106, and an enclosure 102 at least partially surrounding select or all of the components of the electronic device 100. The power switch 106 may turn the electronic device 100 and on and off, e.g., may activate and deactivate the electronic device 100. The power switch 106 may be positioned substantially anywhere on the electronic device 100 and may be substantially any type of input mechanism, e.g., button, switch, knob, and so on.

The display 104 may provide an image or video output for the electronic device 100. The display 104 may be substantially any size and may be positioned substantially anywhere on the electronic device 100. In some embodiments, the display 104 may be a liquid display screen, plasma screen, light emitting diode screen, and so on. The display 104 may further include an input sensor, e.g., capacitive touch screen.

The input member 108 (which may be a switch, capacitive sensor, or other input mechanism) allows a user to interact with the electronic device 100. For example, the input member 108 may be a button or switch to alter the volume, return to a home screen, and the like. Additionally, the input member 108 may also provide haptic feedback or other haptic output for the electronic device 100. The electronic device 100 may include one or more input members 108, and each button 108 may have a single or multiple input/output function. Furthermore, in some embodiments, the input member 108 may be incorporated into the display 104, e.g., a capacitive touch screen as the display 104. The input member 104 (which may be a switch, capacitive sensor, or other input mechanism) allows a user to interact with the electronic device 100.

The enclosure 102 may form a portion of an exterior of the electronic device 100 and may at least partially surround select components, such as a processor, memory, and so on, of the electronic device 100. The enclosure 102 may be removable from the device 100, or may be substantially secured around the select components.

The input port 110 may be formed within or defined by the enclosure 102 and may electrically connect an external device (e.g., headphones, speakers) to one or more internal components of the mobile computing device 100. The input port 110 is configured to receive an electrical connector for the electronic device 100. For example, the input port 110 may be configured to receive a power cord, a data cable (e.g., universal serial bus, fiber optic, tip ring sleeve connector, and the like), or a combination data and power cable. The electronic device 100 may include more than one input port 110 and each input port 110 may be positioned substantially anywhere on the electronic device 100.

The electronic device 100 may also include a sensor 122 positioned substantially anywhere on the electronic device 100. The sensor 122 may include a single sensor or multiple sensors. Additionally, the sensor 122 may be configured to sense substantially any type of characteristic, such as but not limited to, images, pressure, light, touch, heat, movement, relative motion, and so on. For example, the sensor 122 may be an image sensor, a heat sensor, a light or optical sensor, an accelerometer, a pressure transducer, a gyroscope, a magnet, and so on.

Furthermore, the electronic device 100 may include a processor 112, a network/communication interface 114, an input/output interface 118 (which may include the display 104, input members 108, and/or input port 110), and memory 116. The processor 112 may control operation of the electronic device 100 and its various components. The processor 112 may be in communication with the input port 110, the display 104, the input member 108, the network/communication interface 114, the memory 116 and the input/output interface 118. The processor 112 may be any electronic device cable of processing, receiving, and/or transmitting instructions. For example, the processor 112 may be a microprocessor or a microcomputer.

For example, the network/communication interface 114 may be used to place phone calls from electronic device 100 (in embodiments where the electronic device 100 is a phone), may be used to receive data from a network, or may be used to send and transmit electronic signals via a wireless or wired connection (Internet, Wi-Fi, Bluetooth, and Ethernet being a few examples).

The memory 116 may store electronic data that may be utilized by the electronic device 100. For example, the memory 116 may store electrical data or content e.g., audio files, video files, document files, and so on, corresponding to various applications. The memory 116 may be, for example, non-volatile storage, a magnetic storage medium, optical storage medium, magneto-optical storage medium, read only memory, random access memory, erasable programmable memory, or flash memory.

The input/output interface 118 facilitates communication by the electronic device 100 to and from a variety of devices/sources. For example, the input/output interface 118 may receive data from user, control buttons (e.g., input member 108) on the electronic device 100, and so on. Additionally, the input/output interface 116 may also receive/transmit data to and from an external drive, e.g., a universal serial bus (USB), or other video/audio/data inputs. Furthermore, in other embodiments input/output interface 118 may include an audio output component such as a speaker or audio jack in order to provide an audio output for the device.

It should be noted that FIGS. 1A and 1B are exemplary only. In other examples, the electronic device may include fewer or more components than those shown in FIGS. 1A and 1B.

Input Port Access Through Packaging

Figure 2A:
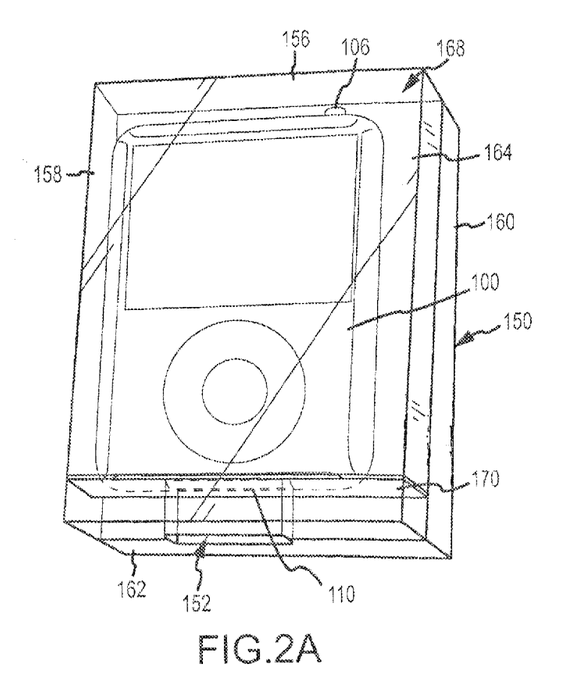
FIG. 2A is a perspective view of the electronic device substantially enclosed in a package.
Figure 2B:
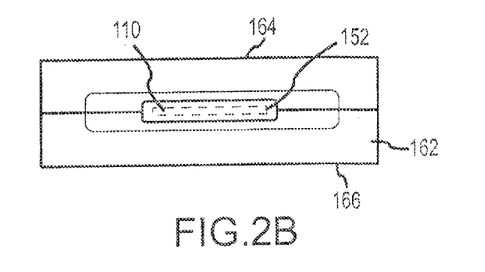
FIG. 2B is a bottom plan view of the electronic device substantially enclosed in the package.

A package for the electronic device 100 will now be discussed. FIG. 2A is an isometric view of the electronic device 100 substantially enclosed within a package 150. FIG. 2B is a bottom plan view of the electronic device 100 enclosed within the package 150. The package 150 may substantially enclose the electronic device 100 and may prevent the electronic device 100 from collecting debris, being damaged, and the like during transportation, distribution, storage, sale, and so on.

The package 150 may be substantially any shape. However, as shown in FIG. 2A, it may be configured to generally correspond to the shape of the electronic device 100. The package 150 may be constructed out of substantially any type of material, such as, but not limited to, plastic, cardboard, paper, expanded polystyrene foam, paperboard, metals or alloys, wood, and so on. In one embodiment, the package 150 may be a hard, at least partially rigid plastic in order to provide a stiff enclosure for the electronic device 100.

The package 150 may include a bottom wall 162 and two sidewalls 158, 160 extending substantially vertically upward from opposite edges of the bottom wall 162 and parallel to each other. The package 150 may further include a top wall 156 spanning horizontally between a top end of each side wall 158, 160. A front and back wall 164, 166 extend from opposite edges of the bottom wall 162, and are substantially perpendicular to the sidewalls 158, 160. It should be appreciated that FIG. 2A is not necessarily drawn to any particular scale or proportion, and is intended to illustrate certain components generally rather than precise, exact relationships between such components. Likewise, some elements or components may be omitted from the view of FIG. 2A in order to more clearly illustrate what is shown in order to effectively describe certain embodiments. The foregoing is true for all other figures in this application, as well.

The package 150 may define a cavity 168 in which the electronic device 100 may be supported. The cavity 168 may be modified based on the desired packaging strength or appearance desired. For example, in some embodiments, the walls 158, 160, 164, 166 may be configured to substantially conform to the shape of the electronic device 100. In these examples, the cavity 168 may substantially trace the shape of the electronic device 100. However, in other embodiments, the cavity 168 may be much larger than the electronic device 100 and the walls of the package 150 may be spaced apart from the electronic device 100.

The package 150 may also include a product support 170 to support the electronic device 100 within the package 150. The product support 170 may position the electronic device 100 at a certain height or position within the package 150. As shown in FIG. 2A, the product support 170 may support a bottom surface of the electronic device 100. However, in other examples, the product support 170 may be differently configured and may support a rear surface of the electronic device 100, a top surface, and so on. Furthermore, the product support 170 may be omitted in other embodiments. It should be noted that after FIG. 2A, the product support 170 has been hidden so that other aspects of the package 150 may be seen.

The package 150 may define an access or connection aperture 152. The access aperture 152 may be defined through a portion of the package 150 and provides an opening to electronically connect to the electronic device 100. For example, a connection cable may be inserted through the access aperture 152 to electronically connect to the electronic device 100. Thus, the electronic device 100 may be accessed without opening the package 150, thereby potentially substantially maintaining the integrity and strength of the package 150. The access aperture may permit content to be loaded onto the device electronically without removing the device from the packaging. The access aperture 152 may be positioned in the package 150 so as to be substantially aligned with the input port 110, therefore the location of the input port 110 may drive the location of the access aperture 152

FIG. 2B is a bottom view of the package 150. As can been seen in FIG. 2B, the access aperture 152 may be substantially aligned with the input port 110, so that a connection cable may be inserted substantially straight through the access aperture 152 in order to connect with the input port 110.

In one example, the access aperture 152 may be a rectangular aperture defined through the bottom wall 162 and may extend into the cavity 168. In other embodiments, such as ones where the cavity 168 may be substantially formed around the electronic device 100, the access aperture 152 may extend through the package 150 to the electronic device 100. In this manner, the access aperture 152 may define a guide path or tunnel through the package 150 to the electronic device 100. It should be noted that, in some embodiments, the access aperture 152 may be defined via slits or cuts within the package 150, which may form a door or living hinge.

The dimensions of the access aperture 152 may be configured based on the electronic device 100, its position and configuration within the package 150, the dimensions of the input port 110, and/or the spatial relationship of the device/input port to the package. For example in some embodiments, the electronic device 100 may include a smaller sized input port 111 than shown in FIG. 1A. In this example, the access aperture 152 may have smaller dimensions than those shown in FIG. 2A.

Figure 2C:
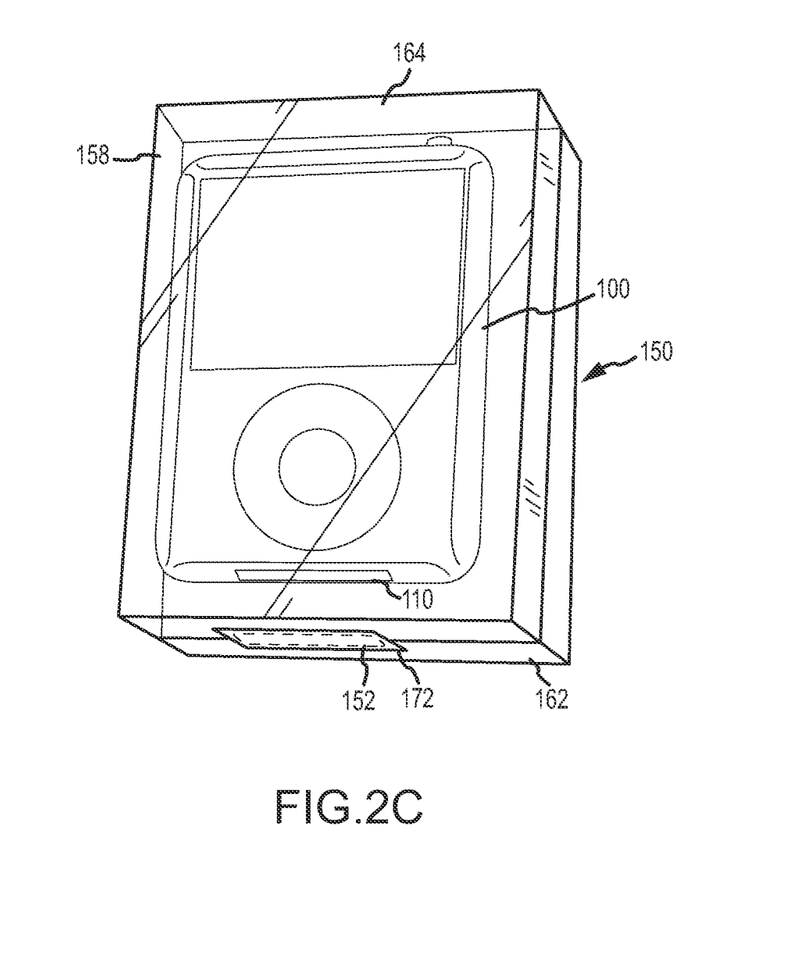
FIG. 2C is a perspective view of the electronic device substantially enclosed in the package and including a temporary cover over an access aperture in the package.

In some embodiments, the package 150 may further include a temporary cover or door to provide a covering or stopper for the access aperture 152. FIG. 2C is a perspective view of the package 150 including the electronic device 100 and a temporary cover 172. The temporary cover 172 may be positioned over the access aperture 152. The temporary cover 172 may be a stopper-like member that may be inserted into the access aperture 152 or may be a label or paper including adhesive that may be positioned cover the access aperture 152. Similarly, the temporary cover 172 may be a door or living hinge that may be define the access aperture 152. The temporary cover 172 may prevent debris, water, or the like from entering into the cavity 168 and the input port 110. The temporary cover 172 may be selectively removable so that the electronic device 100 may be accessed and then replaced to cover the access aperture 152.

Figure 3A:
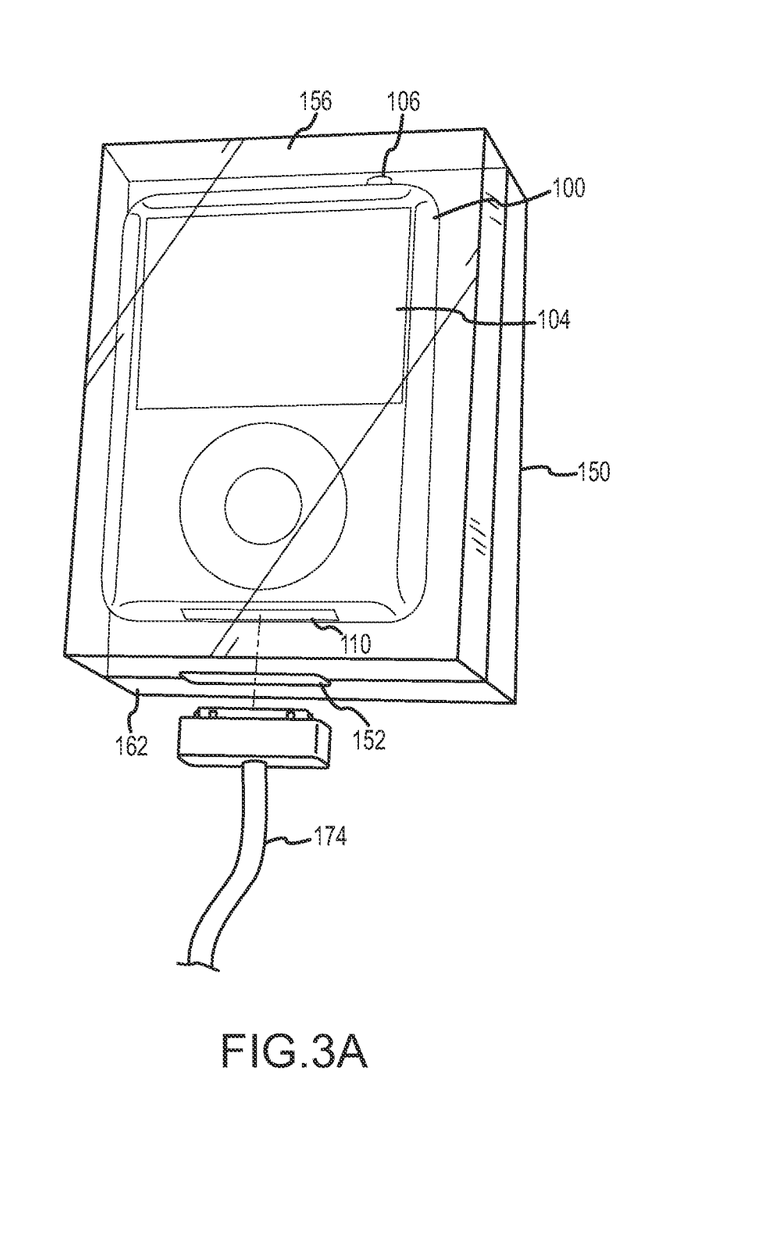
FIG. 3A is a perspective view of the electronic device substantially enclosed in the package with a connector positioned substantially beneath the access aperture.
Figure 3B:
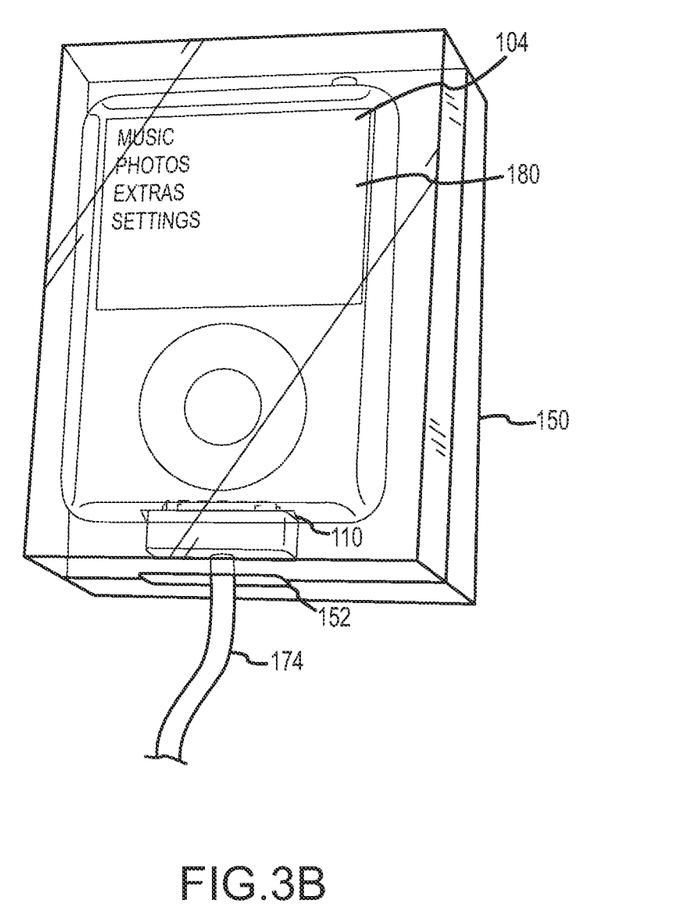
FIG. 3B is a perspective view of the electronic device substantially enclosed in the package with the connector inserted through the access aperture and connected to the electronic device.

As described above, the access aperture 152 may provide a port or pathway for a connector (such as a Universal Serial Bus, or other data cable) to access the input port 110 without substantially damaging or otherwise opening the package 150. FIG. 3A is a perspective view of the electronic device within the package with a connector 174 about to be inserted into the access aperture. FIG. 3B is a perspective view of the electronic device 100 within the package 150 with the connector 174 inserted. The access aperture 152 and the input port 110 are configured to receive the connector 174.

The connector 174 may be electronically connected to a second computing device, such as a computer, laptop, mobile electronic device, store kiosk and the like. The connector 174 may be substantially any type of connector, such as a power and/or data connector. In some examples, the connector 174 may be a USB cable or 30 pin connector. However, other connector types are envisioned as well.

The connector 174 may be inserted into the access aperture 152 and then into the input port 110. Once the connector 174 has been received within the input port 110, the electronic device 100 may be activated or powered on. Additionally, the connector 174 may transfer content or data such as music files, video files, applications, and so on, from the second computer (not shown) to the electronic device 100.

As shown in FIG. 3B, once the connector 174 is inserted into the access aperture 152, the electronic device 100 may activate and the display 104 may display an initial screen 180. The initial screen 180 may be substantially any type of graphical user interface and may include a display of particular data, such as music information, video information or the like. The transfer of content to the electronic device 100 is discussed in more detail below with respect to FIG. 7.

Temporary Connector Embedded into Packaging

Figure 4A:
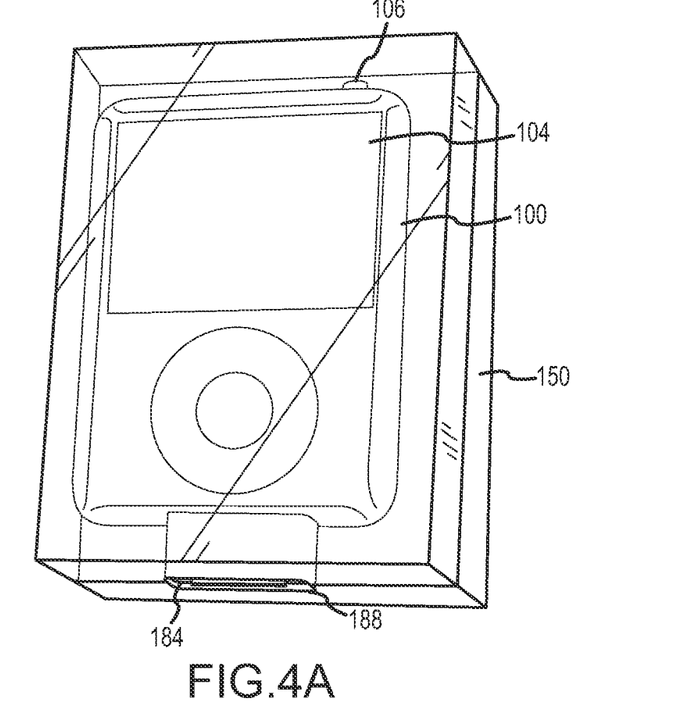
FIG. 4A is a perspective view of another embodiment of the package for enclosing the electronic device.
Figure 4B:
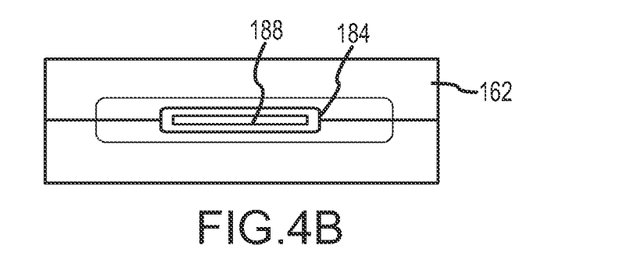
FIG. 4B is a bottom plan view of the package enclosing the electronic device of FIG. 4A.
Figure 5:
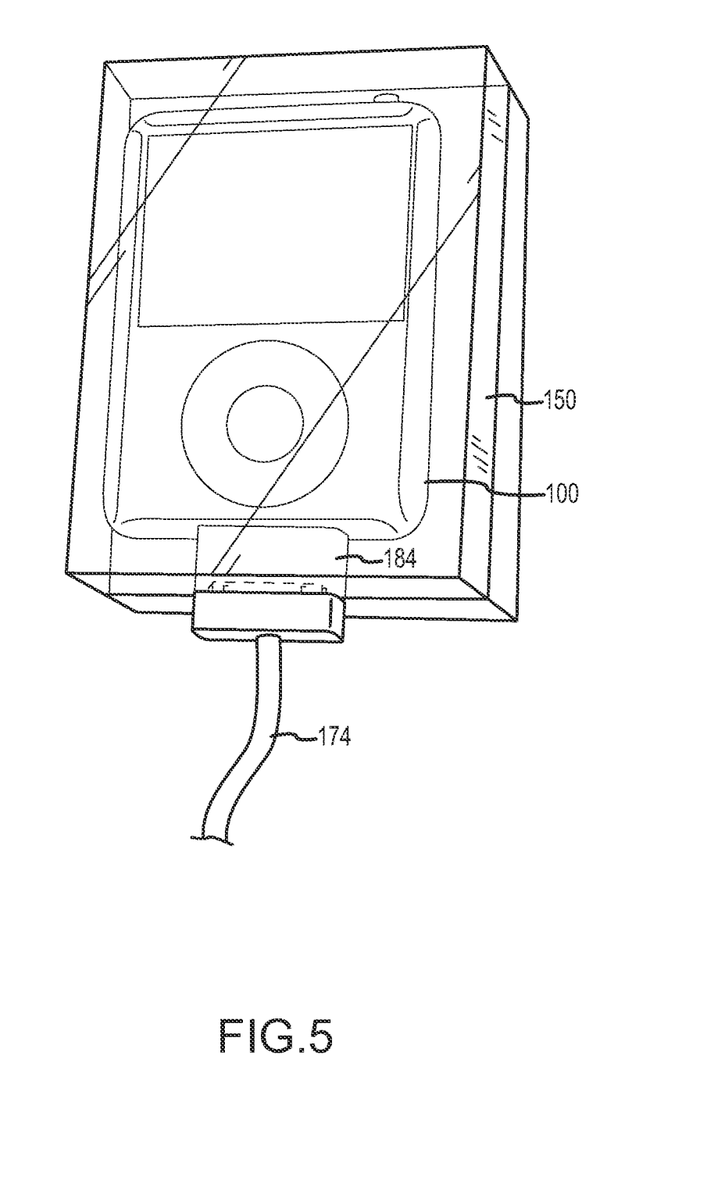
FIG. 5 is a perspective view of the package of FIG. 4A with the connector in communication with the electronic device.

In another embodiment, a temporary or package connector may form a portion of the package 150. FIG. 4A is a perspective view of the electronic device 100 included within the package 150 having a package connector 184. FIG. 4B is a bottom plan view of the electronic device 100 included within the package 150 illustrated in FIG. 4A. The package connector 184 may be formed within the cavity 168 and may be in communication with the input port 110. In one example, the package connector 184 may be in electrical communication with the input port 110.

The package connector 184 may extend through at least a portion of the package 150 and may be substantially flush with the access aperture 152 or may extend slight past or terminate slightly before the bottom wall 162. The package connector 184 may allow the connector 174 to connect to the electronic device 100 without requiring the connector 174 to be inserted into the package 150.

The package connector 184 may be temporary, in that it may be formed of a disposable or relatively inexpensive material, such as cardboard, plastic, or so on. The material forming the package connector 184 may further include conductive wiring, a printed circuit board, or another type of component for transmitting electrical signals. In this manner, the package connector 184 may transmit signals to and from the electronic device 100 and the connector 174. For example, the package connector 184 may be a plastic portion insert molded into the package 150 including electrical contacts or wiring.

The package connector 184 may include a receiving port 188 for receiving a terminal end of the connector 174. The receiving port 188 may be substantially the same as the input port 110, so that the connector 174 may be able to be received within either the package connector 184 or the input port 110.

However, in other embodiments, the receiving port 188 may be configured differently from the input port 110. In these embodiments, a specialized connector may be used in order to connect to the electronic device 100 and the package connector 184 may act as an adapter between the specialized connector and the electronic device 100. These embodiments may assist in preventing theft of the electronic device 100 prior to being sold. For example, the electronic device 100 may be manufactured, transported and stored within the package 150, and may not include any content stored in the memory 116. Once the electronic device 100 is purchased, stocked in a store, or otherwise ready to be used, the specialized connector may connect to the package connector 184 to transfer content to the electronic device 100. In some cases, this content may include an operating system or other key software component necessary to operate or activate the device. As the electronic device 100 may be substantially blank when being transported, and may only be activated or have content downloaded thereto by the specialized connector, a person may be substantially less likely to steal the electronic device 100 (or may be unable to use a stolen device). The specialized connector may be a non-standard connector with a unique pin layout in certain circumstances.

In other embodiments, the package connector 184 may be formed of a more permanent or more expensive material, such as a material similar to the connector 174. For example, the package connector 184 may be a relatively permanent connector that may be included within the entire packaging of the device 100. In this example, the package connector 184 may be inserted into the port 110 and then a second end of the package connector 184 may be positioned to be substantially aligned with the access aperture 152. This embodiment, may allow a connector that may already be included with the packaging to be used to provide access to the electronic device 100 while it is in the package 150.

Similar to the access aperture 152, the package connector 184 may be positioned and configured in order to accommodate the position and orientation of the electronic device 100 within the package 150. For example, although the package connector 184 is illustrated as extending or spanning between an inner surface of the bottom wall 162 of the package 150 to the bottom surface of the electronic device 100, in other embodiments, the package connector 184 may be differently positioned, e.g., on a top, side or other position of the electronic device 100 and/or package 150.

Wireless Connection to the Device

Figure 6A:
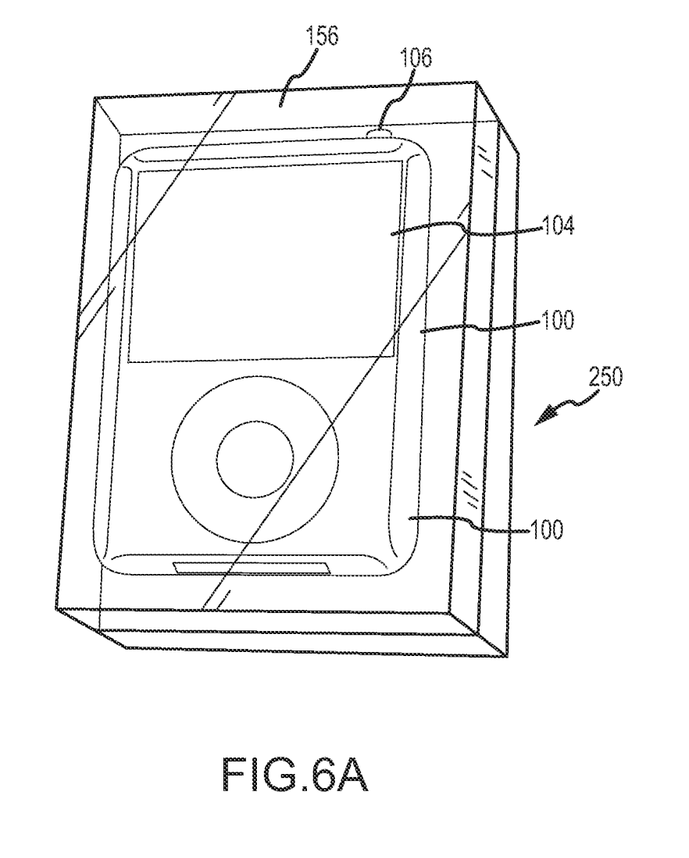
FIG. 6A is another embodiment of an electronic device in a package.

In another embodiment, the electronic device 100 may be activated and content may be transferred to the electronic device 100 wirelessly. FIG. 6A is a perspective view of another embodiment of the package 250. The package 250 may be substantially similar to the package 150, but the access aperture 152 may be omitted. In this embodiment, the package 250 may be substantially enclosed and sealed so that debris, water, and so on, may be substantially prevented from entering into the cavity 168. Thus, the electronic device 100 may be substantially encased within the package 250.

Figure 6B:
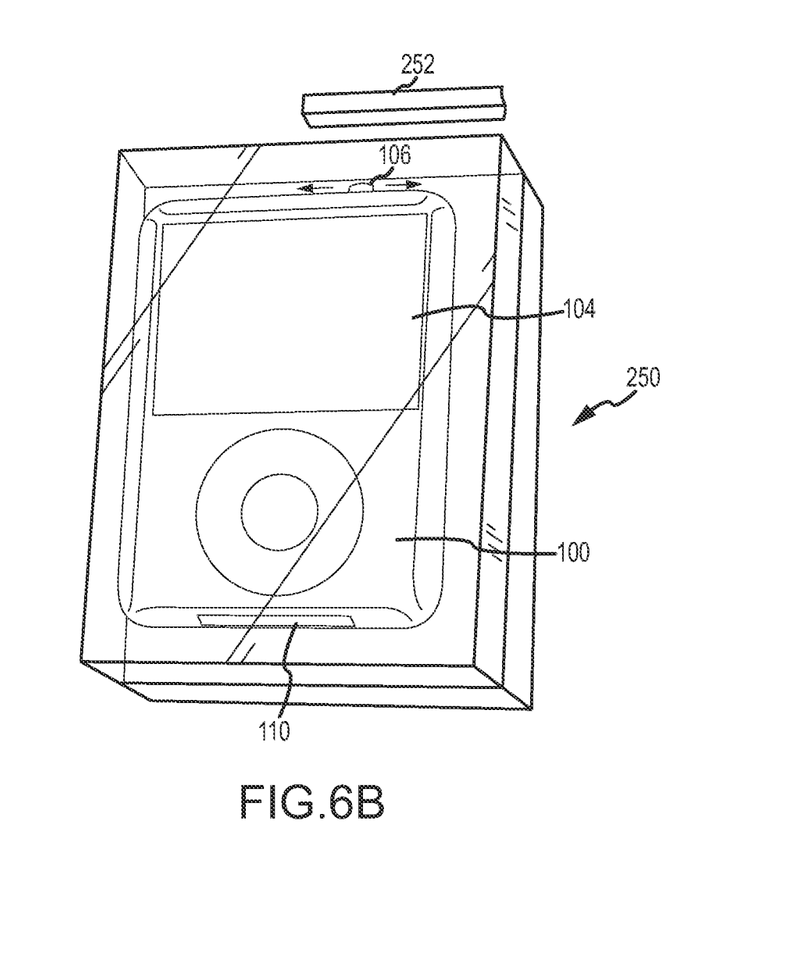
FIG. 6B is a perspective view of a controller positioned over the package and the electronic device of FIG. 6A.

In the embodiment of the package 250 illustrated in FIG. 6A, the electronic device 100 may be activated and content may transferred to the electronic device 100 wirelessly. In one example, an external device, such as a wand or controller, may be used to activate the device. FIG. 6B is a perspective view of the package 250 and the electronic device 100, with a controller 252 activating the electronic device 100. The controller 252 may couple to the electronic device 100 to activate a switch, one example of which is power switch 106.

In one example, the controller 252 may physically move the power switch 106 from an off position to an on position, and vice versa. The arrows in FIG. 6B illustrate the potential relative movement of the power switch 106 as it interacts with the controller 252. For example, the power switch 106 and the controller 252 may be corresponding magnets, such that the controller 252 can magnetically move the power switch 106 (or other relay) mechanically. In this example, the controller 252 and the power switch 106 may be permanent magnets, electromagnets, or programmable magnets. Further, the controller 252 and the power switch 106 may be substantially any type of material that has a magnetic field or can be configured to produce a magnetic field.

In operation, a user may pass the controller 252 over the top wall 156 of the package 250 in a direction in which he or she desires the power switch 106 to move. As the controller 252 passes over the top wall 156, a magnetic force produced by the controller 252 interacts (through the top wall 156) with the power switch 106. The magnetic force may then pull the power switch 106 in the direction that the controller 252 is moving. As the power switch 106 moves from a first position to a second position, the electronic device 100 may change states, e.g., the electronic device 100 may switch from off to on, from hibernate to on, from on to off, and so on.

In one example, the controller 252 may be used to activate or turn on the electronic device 100. After the electronic device 100 is turned on, content, e.g., music files, data, and so on, may be transferred from a second computing device to the electronic device 100 wirelessly, e.g., through the network/communication interface 114 or the like. The transfer of content to the electronic device will be discussed in more detail with respect to FIG. 7.

In other embodiments, the controller 252 may activate the electronic device 100 wirelessly rather than mechanically. For example, the controller 252 may have a unique electronic identifier that corresponds to a unique identifier in the electronic device 100. The sensor 122 may then sense the unique identifier and may activate the electronic device 100.

It should be appreciated that the controller may be stationary in some embodiments and the package, with device, passed beneath it to achieve the same results discussed herein.

In one example, the controller 252 may include a RFID tag that may correspond to the electronic device 100. As the controller 252 passes over the sensor 122, the sensor 122 may recognize the unique identifier (the RFID tag) that may be transmitted by the controller 252. If the unique identifier corresponds to the electronic device 100, the sensor 122 may then activate the electronic device 100. In this example, the sensor 122 may be an active RFID sensor, and may detect the controller's RFID tag. In such embodiments, the controller 252 may employ a passive RFID tag. However, other options are possible.

In another example, the controller 252 may be an induction coil that operates in conjunction with a corresponding coil in the electronic device 100. For example, the sensor 122 may include a corresponding induction coil that may produce a current when placed in close proximity to the controller 252. In another example, the electronic device 100 may include a speaker as a part of the input/output interface 118. As the controller 252 is positioned over the location of the package 250 corresponding to the speaker, the controller 252 may induce a current in a coil of the speaker. For example, the speaker may include a selectively magnetized coil in order to vibrate a diaphragm in order to produce sounds; this coil may be magnetized by the controller 252 while the device 100 is in the package 250.

As the speaker is activated, it may provide an input to the processor 112 to activate the electronic device 100. Similarly, the controller 252 may also induce the speaker coil indirectly. For example, the controller 252 may produce a vibration that causes the diagram of the speaker to vibrate, inducting a current in the speaker coil to wake the device 100. It should be noted that the aforementioned embodiments may also be used with a transducer microphone instead of a speaker in the electronic device 100.

In another embodiment, the controller 252 may be a light source and the sensor 122 may be a light sensor. In this embodiment, the controller 252 may be activated and direct a light, such as a ultra-violet light, an incandescent light, a light emitting diode, or the like, towards the sensor 122 through the package 250. The sensor 122, which may be an optical sensor, or other light sensing component, may then sense the light source and activate the electronic device 100 by sending a signal to the processor 112, or activating a power source of the electronic device 100.

Similar to the previous embodiment, in some embodiments the controller 252 may be omitted and the sensor 122 may be a light sensor. The sensor 122 may then be covered on the outside of the package 250, e.g., by the temporary cover 172. The temporary cover 172 or other item may then be removed when the electronic device 100 is to be activated. The sensor 122 may then detect the ambient light or a change in the light and may the activate the electronic device 100.

Other embodiments for the sensor 122 are also possible. For example, the sensor 122 may be a pressure transducer and the electronic device 100 may be activated by a user blowing air or otherwise providing change in pressure into the package 150.

It should be noted that it substantially any of the above mentioned embodiments, the sensor 122 may be detached from the electronic device 100. For example, the sensor 122 may be included as part of to eh package 250 and may in communication with the electronic device 100, e.g., through input port 110. Thus, the sensor 122 may only be used to activate the electronic device 100, and may not be included during the normal functions of the electronic device 100.

Providing Content to the Device

Figure 7:
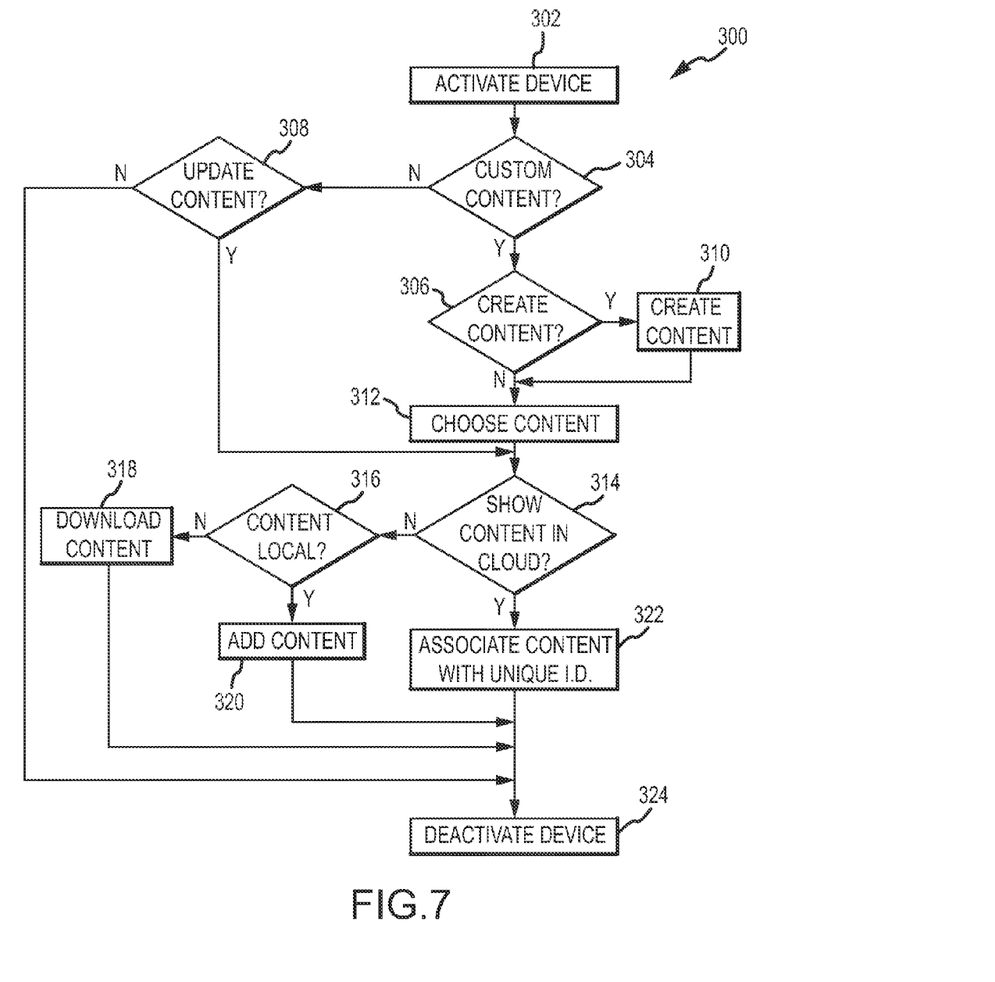
FIG. 7 is a flow chart of an exemplary method for providing custom content to the electronic device.

Once the electronic device 100 is activated, content, such as an operating system, firmware (e.g., programs and/or data structures that internally control various electronic devices), software programs, software updates, firmware updates, data files, and applications may be transferred or associated with the electronic device 100. The content may be customized and individualized for the specific electronic device 100. FIG. 7 is a flow chart of an exemplarily method for providing content to the electronic device 100.

The method 300 may begin with operation 302 and the electronic device 100 may be activated or turned on. As described above, the electronic device 100 may be activated in a number of different manners, such as but not limited to, connecting the connector 174 to the device 100 (either through the access aperture 152 or through the temporary connector 184), or wirelessly activating the electronic device 100.

After the electronic device 100 has been activated, the method 300 may proceed to operation 304. In operation 304, custom content may be associated or downloaded to the device 100. For example, the user may provide an input to the electronic device 100 indicating that he or she may create his or her own content or otherwise select a unique or individualized selection of content to be associated with or downloaded to the device 100. Or, the electronic device 100 may not include an essential software component, and the user may select an option to provide the electronic device 100 with content.

Custom content may be substantially any type of content, but may be individualized for the particular electronic device 100 (for example, content selected by a user). Non-custom content may be content that may be common to all instances of a particular electronic device, such as an operating system or the like. It should be noted that a user may select particular custom content for a first electronic device and then reselect that same custom content for a second electronic device, and the content on each electronic device may still be considered "custom."

In operation 304, if custom content is desired, the method 300 may proceed to operation 306. In operation 306, the electronic device 100 and/or a second computing device may present an option to the user to determine if he or she wishes to create content, e.g., take a photograph, record a sound, or the like. In operation 306, if the user wishes to create his or her own content, the method 300 may proceed to operation 310 and the user may create the content. The content may be created with the electronic device 100, for example, a user may use the sensor 122 to capture an image, record a sound, or the like. In another example, the user may create the content using a second computing device, for example, the user may create the content with a digital camera and transfer the content to the electronic device 100.

After the content has been created or if the user did not choose to create content in operation 306, the method 300 may proceed to operation 312. In operation 312 the user may provide an input to the electronic device 100 or the second computing device selecting content to be associated or downloaded to the electronic device 100. If the content is created by the user, the created content may then be chosen or selected by the user. This may involve providing an input to the electronic device 100 via the input member 108 indicating that a particular content should be added or may involve selecting a content on a second computing device.

The content may be selected or chosen from a variety of sources, including the custom content, which may be on the electronic device 100 itself, online content (e.g., content available from online retailers), content stored in the memory of the second computing device and so on. The content may be selected by the electronic device 100 or by the second computing device as well. As an example, the content may be a music selection of the top 25 artists, which may be automatically selected by the electronic device 100 or the second computing device.

Returning briefly to operation 304, in operation 304, if the user does not chose to create custom content, the method 300 may proceed to operation 308. In operation 308 the user, the electronic device 100, or the second computing device may determine whether the content should be updated. In one example, the user decide that the content of the device 100 to be updated. In a second example, the second computing device may determine that the content may need be updated. In yet another example, the electronic device 100, once activated in operation 302, may determine that its content is out of date and needs to be updated.

The content that may be updated may be content already included on the electronic device 100. The electronic device 100 may include an operating system, data files, musical files, and the like that may be updated. For example, the electronic device 100 may include software which may have been updated to a new version while the electronic device 100 was being transported or stored. Thus, if content is to be updated on the electronic device 100, the new version of the software may be downloaded or associated with the electronic device 100, while the electronic device 100 is encased within the package 150, 250.

After operation 312, or in operation 308, the content was chosen to be updated, the method 300 may proceed to operation 314. In operation 314 the electronic device 100 or the second computing device presents an option to the user whether the content should be stored over a network or whether the content should be stored on the electronic device 100. If the content is to be stored remotely, e.g., in cloud storage over a network, the method 300 may proceed to operation 322. In operation 322 the electronic device 100 associates the content with a unique identifier. The unique identifier may be a serial number of the electronic device 100, a gift card, a user name, a store name, and so on. Substantially any type of identification to associate the content with the particular user or with the electronic device 100 may be used.

Once the content is associated with the electronic device 100 or the user, the content may be selectively or automatically accessed. For example, a user may associate the content with the electronic device 100 while in a retail store purchasing the electronic device 100. After the electronic device 100 has been purchased, the user may take it home and turn on the electronic device 100. In one example, the content may be automatically associated with the electronic device 100 and may be accessibly substantially immediately when the user activates the electronic device 100. In another example, the electronic device 100 may present the user the option of accessing the content, or the user may search for the content. Thus, the content accessible by the electronic device 100 may be substantially customized without opening the package 150, 250 or destroying the package 150, 250.

After the content has been associated with a unique identifier, the method 300 may proceed to operation 324 and the electronic device 100 may be deactivated. As described above, the electronic device 100 may be deactivated by a user either wirelessly, wired, or another manner, e.g., predetermined time-out session, the device 100 turns off after a set period.

In operation 314, if the content is not stored remotely, the method 300 may proceed to operation 316. In operation 316 the electronic device 100 or the second computing device determines if the content is local to the electronic device 100. For example, the content may already be stored on the memory 112 of the device 100 as the content may have been created with the electronic device 100. If the content is local, the method 300 may proceed to operation 320 and the content may be added by the electronic device 100, if the content has not already been added to the memory 112 of the electronic device 100.

In operation 316, if the content is not local, the method 300 may proceed to operation 318. In operation 318 the content is downloaded to the electronic device 100 via the connection cable 174, the temporary connector 184, or wirelessly (e.g., via the network/communication interface 114, sensor 122, or input/output 118). In one embodiment, the content may be transferred to the electronic device 100 via the connection cable 174. In another embodiment, the content may be downloaded to the electronic device 100 via the network/communication interface 114. After the content has been downloaded or otherwise added to electronic device 100, the method 300 may proceed to operation 324 and the device may be deactivated.

Figure 8:
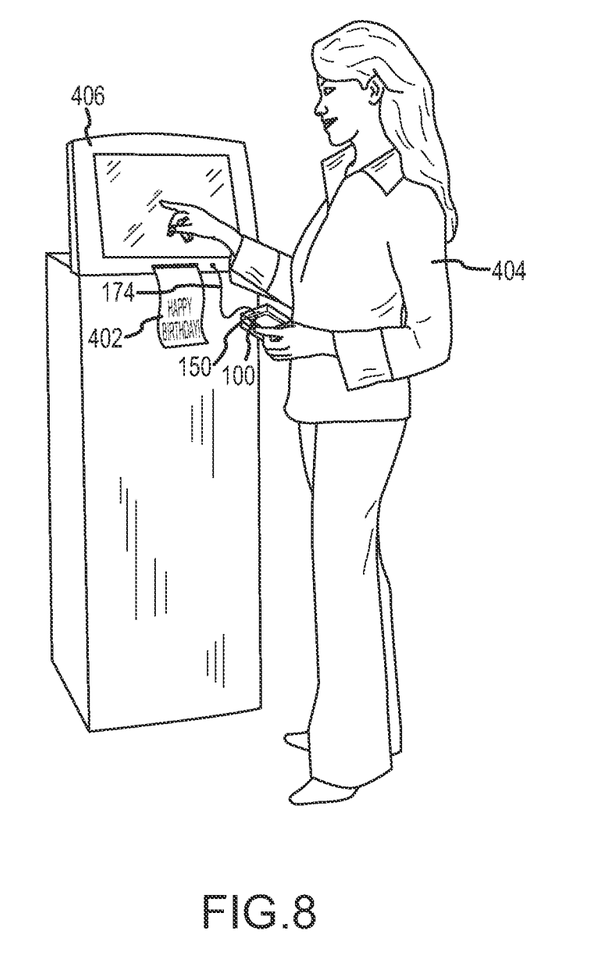
FIG. 8 is a diagram of a user using a second computing device to provide custom content and a label for the electronic device.

After the content has bee added or otherwise associated with the electronic device 100, a label 402 may be created. FIG. 8 is a diagram of a user 404 creating a customized label 402 to place on the package 150, 250. The user 404 may use a second computing device 406, which may be in the form of a computer, laptop, mobile electronic device, or as shown in FIG. 8, a kiosk, to create the label 402. The label 402 may be designed by the user and/or my correspond to the content added or associated with the electronic device 100. For example, the content may be transferred to the electronic device 100 from the second computing device 406, and thus the label 402 may be based on the content, e.g., a printout of the content names, an album cover corresponding to music downloaded to the device 100, and so on. Alternatively or additionally, the user 404 may create the label 402 themselves.

Furthermore, the second computing device 406 may also be used to erase content included on the electronic device 100. For example, a user may use method 300 to associate or download content to the electronic device 100 but may then not purchase the electronic device 100. In this example, the second computing device 406 may be used to erase content on the electronic device 100. The operations for erasing the content may be substantially the same as adding content to the electronic device 100, in that the device 100 may be activated and electronically accessed, but content may be removed rather than added.

The method 300 and the embodiments for the package 150, 250 and electronic device 100 described herein may allow content to be customized and added to an electronic device without damaging or opening the packaging. This allows a user to give a personalized gift to a person, which may include selected content by the user in addition to the hardware and standardized content already include on the electronic device 100. Furthermore, content may be updated, e.g., software programs, after a product has manufactured and shipped. Thus a user may purchase an electronic device with the most current software, even if the device had been manufactured weeks or months prior to the purchase.

Moreover, the embodiments described herein may provide theft protection for electronic devices. Electronic devices may be manufactured and transported without any content stored thereon. The content may then be added via a proprietary connector, unique identifier, or the like, as the electronic device is purchased. Thus, if an electronic device is stolen during transportation the device may be substantially useless.

CONCLUSION

The foregoing description has broad application. For example, while examples disclosed herein may focus on the packaging for an electronic device, it should be appreciated that the concepts disclosed herein may equally apply to packaging for other devices and apparatuses. Similarly, although the electronic device may be discussed with respect a mobile electronic device, the devices and techniques disclosed herein are equally applicable to other types of devices. Accordingly, the discussion of any embodiment is meant only to be exemplary and is not intended to suggest that the scope of the disclosure, including the claims, is limited to these examples.

What is claimed is:

1. A method for providing customized content to an electronic device comprising:
   wirelessly activating the electronic device through a packaging substantially surrounding the electronic device without substantially damaging or removing the packaging by passing a magnetic wand over a portion of the packaging and physically moving a mechanical power switch of the electronic device using a magnetic field of the magnetic wand from a first position to a second position so that the mechanical power switch remains in the second position in the absence of the magnetic field, thereby switching an electronic switch within the electronic device;
   connecting the electronic device to content; and
   providing the content to the electronic device without substantially damaging or removing the packaging.

2. The method of claim 1, wherein providing the content to the electronic device comprises one of downloading the content to the electronic device or associating the content to the electronic device.

3. The method of claim 2, wherein associating the content with the electronic device comprises providing a unique identifier corresponding to the electronic device.

4. The method of claim 2, wherein activating the electronic device through the packaging comprises inserting a connector through a connection aperture within the packaging.

5. The method of claim 2, wherein the packaging further comprises a temporary connector and activating the electronic device through the packaging comprises electronically connecting a data connector to the temporary connector.

6. The method of claim 5, wherein connecting the electronic device to a content comprises connecting the electronic device to a computer via the data connector.

7. The method of claim 1, wherein providing the content to the electronic device comprises wirelessly transmitting data from a computer to the electronic device.

8. The method of claim 1, wherein the content is at least one of an operating system, firmware update, an application, or a data file.

9. A system packaging an electronic device, comprising:
   an electronic device comprising:
      a processor;
      an enclosure at least partially surrounding the processor and defining an input port;
      a mechanical power switch coupled with the electronic device, wherein the mechanical switch is comprised of a magnetic material;
   a package substantially surrounding the electronic device, the packaging comprising:
      an access aperture substantially aligned with the input port,
      an internal guide path that actively guides a connector for communicating with the electronic device through the packaging and into a position for coupling with the input port;
   a magnetic wand configured for physically moving the mechanical power switch of the electronic device by a magnetic field of the magnetic wand from a first position on the electronic device to a second position on the electronic device, thereby switching an electronic switch within the electronic device.

10. The system of claim 9, further comprising a temporary connector spanning between the input port and the access aperture.

11. The system of claim 9, further comprising a living hinge coupled with the package and configured to releasably seal the access aperture.

12. The system of claim 11, wherein the living hinge, when sealing the access aperture, prevents water from entering the input port.

13. A non-transitory computer-readable storage medium comprising: a medium configured to store computer-readable instructions thereon; and
   the computer-readable instructions that, when executed by a processing device cause the processing device to perform a method, comprising:
      wirelessly activating the electronic device through a packaging substantially surrounding the electronic device without substantially damaging or removing the packaging by passing a magnetic wand over a portion of the packaging and physically moving a mechanical power switch of the electronic device using a magnetic field of the magnetic wand from a first position to a second position so that the mechanical power switch remains in the second position in the absence of the magnetic field, thereby switching an electronic switch within the electronic device;

connecting the electronic device to content; and providing the content to the electronic device without substantially damaging or removing the packaging.

14. The non-transitory computer-readable storage medium of claim 13, wherein providing the content to the electronic device comprises one of downloading the content to the electronic device or associating the content to the electronic device, and wherein associating the content with the electronic device comprises providing a unique identifier corresponding to the electronic device.

15. The non-transitory computer-readable storage medium of claim 13, wherein the packaging further comprises a temporary connector and activating the electronic device through the packaging comprises electronically connecting a data connector to the temporary connector.

16. The non-transitory computer-readable storage medium of claim 15, wherein connecting the electronic device to a content comprises connecting the electronic device to a computer via the data connector.

17. The non-transitory computer-readable storage medium of claim 13, wherein providing the content to the electronic device comprises wirelessly transmitting data from a computer to the electronic device.

18. The non-transitory computer-readable storage medium of claim 13, wherein the content is at least one of an operating system, firmware update, an application, or a data file.

* * * * *